(12) United States Patent
Liu et al.

(10) Patent No.: US 11,302,060 B2
(45) Date of Patent: Apr. 12, 2022

(54) METHOD AND SYSTEM FOR VECTOR-RASTER OVERLAY ANALYSIS OF GROUND SURFACE IMAGE AREA BASED ON EDGE CLIPPING

(71) Applicant: WUHAN UNIVERSITY, Hubei (CN)

(72) Inventors: Yaolin Liu, Hubei (CN); Peng Xie, Hubei (CN); Yiheng Wang, Hubei (CN); Yanfang Liu, Hubei (CN); Jingzhong Li, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 50 days.

(21) Appl. No.: 16/860,076

(22) Filed: Apr. 28, 2020

(65) Prior Publication Data
US 2020/0342655 A1    Oct. 29, 2020

(30) Foreign Application Priority Data
Apr. 29, 2019   (CN) .......................... 201910354073.3

(51) Int. Cl.
| | |
|---|---|
| G06T 15/10 | (2011.01) |
| G06T 7/12 | (2017.01) |
| G06F 9/30 | (2018.01) |
| G06T 15/00 | (2011.01) |

(52) U.S. Cl.
CPC .......... *G06T 15/10* (2013.01); *G06F 9/30036* (2013.01); *G06T 7/12* (2017.01); *G06T 15/005* (2013.01)

(58) Field of Classification Search
CPC ......... G06T 15/10; G06T 7/12; G06T 15/005; G06F 9/30036
See application file for complete search history.

(56) References Cited

PUBLICATIONS

Xie P, Liu Y, He Q, Zhao X, Yang J. An Efficient Vector-Raster Overlay Algorithm for High-Accuracy and High-Efficiency Surface Area Calculations of Irregularly Shaped Land Use Patches. ISPRS International Journal of Geo-Information. Jun. 2017;6(6):156.*

* cited by examiner

*Primary Examiner* — Xin Sheng
(74) *Attorney, Agent, or Firm* — JCIPRNET

(57) ABSTRACT

A method and a system for vector-raster overlay analysis of a ground surface image area based on edge clipping are provided. A large amount of computing resources is required during the calculation of extracting a ground surface image area using the vector-raster overlay analysis and a loss of accuracy is resulted when vector data is converted into raster data, thereby leading to the issue of calculation error of a polygon surface area. The disclosure adopts the vector-raster overlay analysis method while cropping an edge vector polygon of the ground surface image to be measured and allocating an attribute value of the image according to a pixel, so as to accurately calculate the ground surface image area without drastically increasing the amount of calculation, thereby achieving the function of improving the accuracy and efficiency of calculating the ground surface image area.

15 Claims, 9 Drawing Sheets

METHOD AND SYSTEM FOR VECTOR-RASTER OVERLAY ANALYSIS OF GROUND SURFACE IMAGE AREA BASED ON EDGE CLIPPING

CROSS-REFERENCE TO RELATED APPLICATION

This application claims the priority benefit of China application serial no. 201910354073.3, filed on Apr. 29, 2019. The entirety of the above-mentioned patent application is hereby incorporated by reference herein and made a part of this specification.

BACKGROUND

Technical Field

The disclosure relates to the technical field of ground surface image extraction, and particularly relates to a method and a system for vector-raster overlay analysis of a ground surface image area based on edge clipping.

Description of Related Art

After a ground surface image is extracted through geographic information system (GIS), analysis and processing need to be performed. Spatial overlay analysis is a basic spatial analysis function commonly used in GIS. Spatial overlay analysis algorithm for the same type of data structure (that is, between vector data and between raster data) has been widely used in various geographic information system analysis software. Vector-raster overlay analysis refers to the need for spatial analysis of mixed data type due to abundant data sources, that is, the spatial overlay analysis between vector data and raster data. When overlay calculation analysis is performed on vector data and raster data, since the raster edge does not coincide with the vector, a large amount of calculation resources will be used if the full vector calculation is adopted. That is, the resulting graphic may be obtained through calculation of accurately cropped vector polygon edge and the raster pixel edge. The resulting attribute may be indirectly obtained through using the ratio of the area of an irregular polygon generated after the raster pixel intersects with the polygon to the area of the pixel as a coefficient, and then multiplying by the pixel attribute value. However, although the method has high accuracy, a large amount of calculation resources is required. In practical applications, converting quantity data into raster data is often adopted, and then spatial overlay analysis is performed based on a unified raster data basis. However, converting the vector data into the raster data will inevitably cost the loss of accuracy. That is, if the pixel attribute is determined by adopting methods such as the pixel center point attribution or area dominance method, no matter what method is used, it will lead to the edge of the converted polygon element represented based on raster to be inconsistent with the edge of the polygon represented by the original vector, thereby leading to an error in the calculation of the surface area of the polygon.

SUMMARY

The disclosure provides a method and a system for vector-raster overlay analysis of a ground surface image area based on edge clipping, so as to improve the accuracy and efficiency of calculating the ground surface image area.

In view of the above, the method for vector-raster overlay analysis of the ground surface image area based on edge clipping includes the following steps.

Step S1: data of a raster dataset A and a vector dataset B of an area to be measured is collected.

Step S2: a polygon b in the vector dataset B is traversed to obtain four-to-coordinate extremums.

Step S3: the polygon b is traversed to obtain a smallest raster slice a of the raster dataset A completely covering the polygon.

Step S4: the raster slice a is traversed by row to obtain an outer rectangle R of a pixel row.

Step S5: the polygon b is cropped using the outer rectangle R to obtain a resulting point-set polygon S; a result obtained by traversing the resulting point-set polygon S is stored into a result set C, and a pixel attribute value is allocated according to an area ratio and is included in the result set C.

Step S6: attribute values in the result set C are collated as a result for overlay analysis of the raster dataset A and the vector dataset B.

According to the above, the specific steps in Step S2 are as follows.

Step S21: the polygon b of the vector dataset B is traversed.

Step S22: the four-to-coordinate extremums of the polygon b are initialized to XE, XW, YN, and YS, respectively.

Step S23: a node of the polygon b is traversed to be set to $(X_b, Y_b)$.

Step S24: an execution edge is determined, wherein if $X_b > XE$, then $XE = X_b$; if $X_b < XW$, then $XW = X_b$; if $Y_b > YN$, then $YN = Y_b$; and if $Y_b < YS$, then $YS = Y_b$.

Step S25: after the node of the polygon b is traversed, the four-to-coordinate extremums XE, XW, YN, and YS are included into an attribute list of the polygon b, and the process is executed from Step S21 in cycle until all polygons in the vector dataset B are traversed.

Further, the specific steps in Step S3 are as follows.

Step S31: starting point coordinates X0 and Y0 and pixel sizes Xs and Ys of the raster dataset A are read.

Step S32: the four-to-coordinate extremums XE, XW, YN, and YS of the polygon b are read.

Step S33: a starting row number Rstart, a starting column number Cstart, a stopping row number Rstop, and a stopping column number Cstop of the raster slice a are calculated and data of the raster slice a is read:

$R\text{start} = \lfloor (YN - Y0)/Ys \rfloor,$ $C\text{start} = \lfloor (XW - X0)/Xs \rfloor,$ $R\text{stop} = \lfloor (YS - X0)/Ys \rfloor,$ $C\text{stop} = \lfloor (XE - X0)Xs \rfloor,$ Further, the specific steps in Step S4 are as follows.

Step S41: a data row of the raster slice a is traversed and recorded as ARow.

Step S42: a row number Ra, the starting column number Cstart, and the stopping column number Cstop of the data row ARow are read.

Step S43: the outer rectangle R of the data row ARow is created and vertex coordinates (Xmin, Ymax), (Xman, Ymax), (Xmax, Ymin), and (Xmin, Ymin) of the outer rectangle R are respectively calculated:

$X\min = C\text{start} \cdot Xs,$ $X\max = (C\text{stop}+1) \cdot Xs,$ $Y\min=(Ra+1)\cdot Ys,$ $Y\max=Ra\cdot Ys,$ Further, the specific steps in Step S5 are as follows.

Step S51: the polygon b is cropped using the outer rectangle R to obtain the resulting point-set polygon S.

Step S52: a coordinate point in the resulting point-set polygon S is set as $P_i (i \in N^*)$ and a first node $P_1$ of the resulting point-set polygon S is stored in a temporary queue L.

Step S53: a $P_1$ point of the resulting point-set polygon S is traversed and stored in the temporary queue L, a result set is set as C, a current last node of the temporary queue L is set as $P_c$, and a secondary node of $P_c$ in the resulting point-set polygon S is $P_{c+1}$.

Step S54: values of $P_{c+1}$ and $P_1$ are compared, wherein if $P_{c+1}=P_1$, then $P_i$ is traversed and the process returns to Step S3 after executing Step S57; and if $P_{c+1} \neq P_1$, then a number n of a pixel where $P_c$ is located is obtained and a number m of a pixel where $P_{c+1}$ is located is obtained.

Step S55: values of n and m are compared, wherein if n=m, then Step S58 is executed; and if n≠m, then a horizontal coordinate x of the pixel edge between the pixels n and m is obtained, a straight line segment lc is created according to the $P_c$ point and the $P_{c+1}$ point, a y value is solved by substituting x into lc, a pixel edge focal point $P_{edge}(x, y)$ between the straight line segment lc and n and m is recorded, and $P_{edge}(x, y)$ is stored into a last part of the temporary queue L.

Step S56: a lower edge vertical coordinate of the outer rectangle R is set as yb, a horizontal coordinate of a pixel edge between the pixels n and m is set as x, a point (x, yb) is stored into the last part of the temporary queue L, a horizontal coordinate of a first point of the temporary queue L is set as xs, and a point (xs, yb) is stored into the last part of the temporary queue L.

Step S57: an area of a temporary polygon s-tmp surrounded by a point set in the temporary queue L is calculated and a pixel attribute value is allocated according to an area ratio method and is included in the result set C.

Step S58: the temporary queue L is cleared, $P_{c+1}$ is stored into the last part of the temporary queue L, and Step S53 is executed until traversal is completed.

Further, in Step S57, the specific steps of the area ratio method are as follows. The area of the temporary polygon s-tmp is set as $S_v$, the area of the pixel n is set as $S_r$, and the attribute value of the pixel n is allocated as the attribute value of the temporary polygon s-tmp according to the ratio of $S_v/S_r$.

According to the above, in Step S1, the area to be measured is the area of the ground surface image to be measured; the raster dataset A includes a regular grid dividing the ground surface image, each grid unit is a pixel, and the pixel is the smallest unit forming a digital image; and the vector dataset B includes several polygon data of the ground surface image.

Further, in Step S5, the resulting point-set polygon S includes multiple temporary polygons; and the area ratio is the ratio of the area of a temporary polygon to the area of the pixel in which the temporary polygon is located.

According to the above, in Step S2, the four-to-coordinate extremums are the edge coordinate extremums in four directions of east, west, south, and north of the polygon b.

Further, in Step S41, the data row of the raster slice a is a row of a pixel of the raster slice a.

According to the above, the following step is added between Step S4 and Step S5. Whether all outer rectangles in the raster slice a have cropped the polygon b is determined, wherein if not, then the polygon b is cropped using the outer rectangle R to obtain the resulting point-set polygon S; and if yes, then iteration of Step S5 is completed.

Further, the following step is added between Step S5 and Step S6. Step S5 is repeated until all outer rectangles of the raster slice a have cropped the polygon b.

Further, Step S54: the values of $P_{c+1}$ and $P_1$ are compared, wherein if $P_{c+1}=P_1$, then the area $S_v$ of the temporary polygon s-tmp surrounded by the point set in the temporary queue L is calculated; the area of the pixel n is set as $S_r$, the attribute value of the pixel n is allocated according to the ratio of $S_v/S_r$, and whether all outer rectangles in raster slice a have cropped the polygon b is determined, wherein if not, then the polygon b is cropped using the outer rectangle R to obtain the resulting point-set polygon S; and if yes, then iteration of Step S5 is completed; and if $P_{c+1} \neq P_1$, then the number n of the pixel where $P_c$ is located is extracted and the number m of the pixel where $P_{c+1}$ is located is extracted.

Further, the specific steps in Step S6 are as follows.

Step S61: the pixel attribute values of the resulting point-set polygon S are summed up.

Step S62: the result set is set as C and the pixel attribute values in the resulting point-set polygon S are stored into the result set C and are outputted.

Step S63: whether the polygon in the vector dataset B is traversed is determined, wherein if not, Step S2 is executed; and if yes, iteration is completed.

A system for vector-raster overlay analysis of a ground surface image area based on edge clipping includes a four-to-coordinate extremum module, a minimum raster slice module, a pixel row outer rectangle module, a cropping module, and a pixel attribute allocation module.

The four-to-coordinate extremum module, the smallest raster slice module, the pixel row outer rectangle module, the cropping module, and the pixel attribute allocation module are connected in series.

The four-to-coordinate extremum module is configured to traverse graphic data of the polygon b in the vector dataset B to obtain the four-to-coordinate extremums of the polygon b; the vector dataset B includes several polygon data of the ground surface image, the polygon b is a polygon formed by the edge of the ground surface image to be measured, and the four-to-coordinate extremums are edge coordinate extremums in four directions of east, west, south, and north of the polygon b.

The minimum raster slice module is configured to obtain data of the smallest raster slice a of the raster dataset A completely covering the polygon b according to starting point coordinates of the raster dataset A, pixel sizes of the raster dataset A, and the four-to-coordinate extremums of the polygon b; and the raster dataset A includes spatial information of the ground surface image and the pixel is the smallest unit of the digital image.

The pixel row outer rectangle module is configured to traverse the raster slice a by row to obtain the outer rectangle R of the pixel row.

The cropping module is configured to crop the polygon b using the outer rectangle R to obtain the resulting point-set polygon S including multiple temporary polygons and pixels.

The pixel attribute allocation module is configured to traverse the resulting point-set polygon S and allocate the pixel attribute value of the resulting point-set polygon S according to the ratio of an area of a temporary polygon to an area of a pixel where the temporary polygon is located as the analysis result.

Further, the raster dataset A includes a regular grid dividing the ground surface image and each grid unit is a pixel.

Further, the vector dataset B includes large-scale terrain image data of the ground surface image and the structure of the vector data of the ground surface image includes a simple data structure, a topology data structure, and a curved surface data structure.

A computer storage medium stores a computer program executable by a computer processor and the computer program executes the method for vector-raster overlay analysis of a ground surface image area based on edge clipping.

The advantages of the disclosure are as follows.

1. The method and system for vector-raster overlay analysis of the ground surface image area based on edge clipping according to the disclosure can accurately calculate the ground surface image area without drastically increasing the calculation amount through cropping the edge vector polygon of the ground surface image to be measured and allocating the image attribute values according to the pixels, thereby realizing the function of improving the accuracy and efficiency of calculating the ground surface image area.

2. The disclosure has strong practicality and low cost, and facilitates economic benefits in the field of image processing.

DELASTED DESCRIPTION OF DISCLOSED EMBODIMENTS

The disclosure will be further described in detail below with reference to the accompanying drawings and specific embodiments.

In the embodiments of the disclosure, the Shennongjia Forestry District is used as the research area and raster data of a ground surface image of the research area and a vector polygon data of the forest pattern are used as data sources. Overlay analysis is performed on the raster data and the vector polygon data of the forest pattern to extract the area of the forest pattern terrain, wherein the collection of the raster data is a raster dataset A of the ground surface image of the research area and the collection of the vector polygon data of the forest pattern is a vector dataset B of the ground surface image of the research area.

Figure 1:
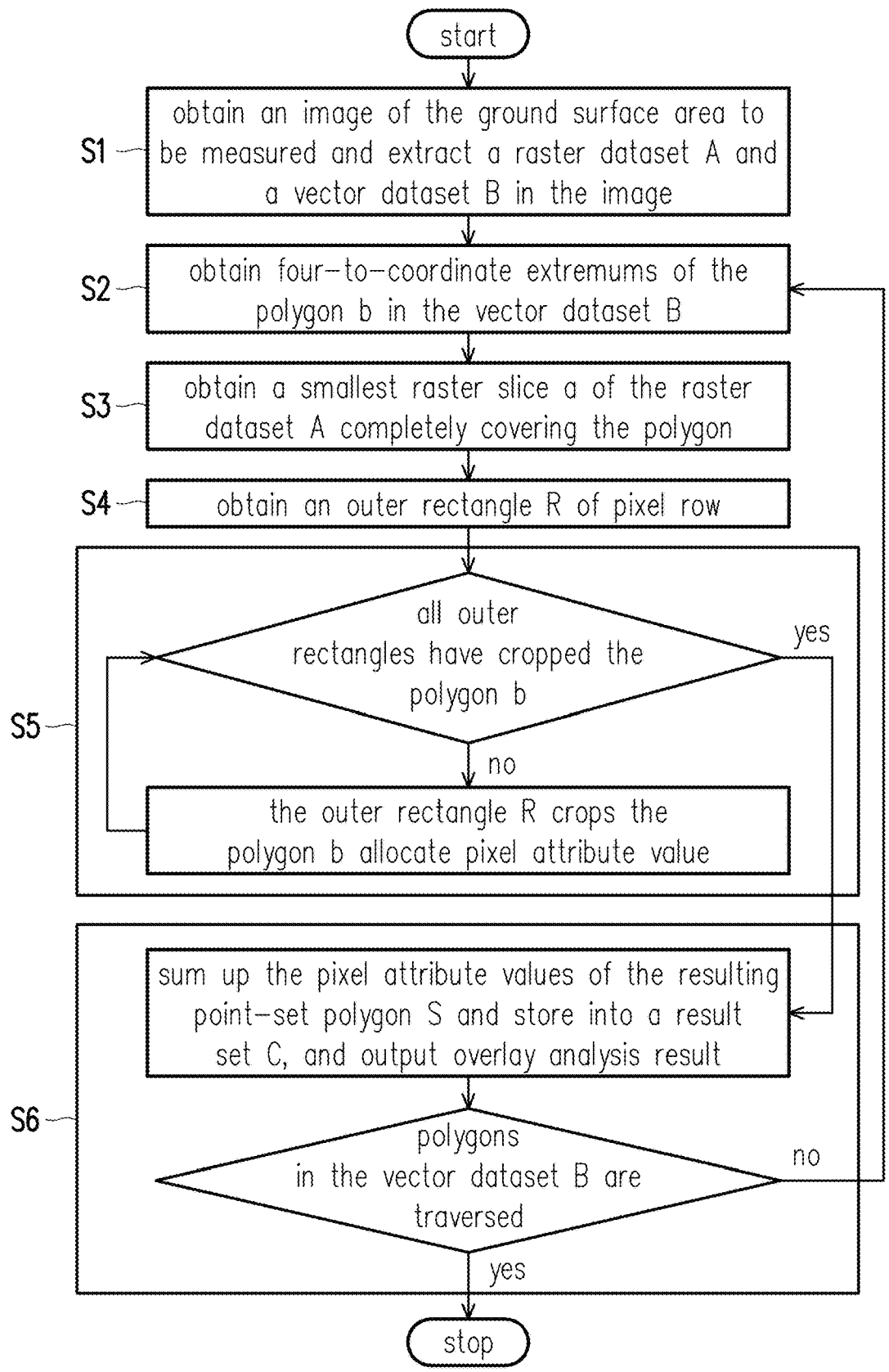
FIG. 1 is a flowchart according to an embodiment of the disclosure.

Referring to FIG. 1, a method for vector-raster overlay analysis of a ground surface image based on edge clipping according to the disclosure includes the following steps.

Step S1: obtain a ground surface image of the Shennongjia forestry district to be measured and extract a raster dataset A and a vector dataset B in the image; the raster dataset A includes a regular grid dividing the ground surface image of the Shennongjia forestry district, wherein each grid unit is a pixel and the pixel is the smallest unit forming a digital image; and the vector dataset B includes several polygon data of the ground surface image of the Shennongjia forestry district.

Step S2: set a polygon in the vector dataset B as b and traverse edge points of the polygon b to obtain four-to-coordinate extremums, wherein the four-to-coordinate extremums are edge coordinate extremums in four directions of east, west, south, and north of the polygon b.

Step S3: obtain a smallest raster slice a of the raster dataset A completely covering the polygon b according to starting point coordinates of the raster dataset A, pixel sizes, and the four-to-coordinate extremums of the polygon b.

Step S4: traverse the raster slice a according to a row of a pixel to obtain an outer rectangle of several pixel rows.

Step S5: set the outer rectangle as R, use the outer rectangle R to crop the polygon b to obtain a resulting point-set polygon S including multiple temporary polygons, allocate a pixel attribute value in the resulting point-set polygon S according to a ratio of an area of a temporary polygon to an area of a pixel where the temporary polygon is located, and repeat Step S5 until all outer rectangles of the raster slice a have cropped the polygon b.

Step S6: collate and output the pixel attribute values of the resulting point-set polygon S as an analysis result; and execute Step S2 until all polygons in the vector dataset B have been traversed.

Figure 2:
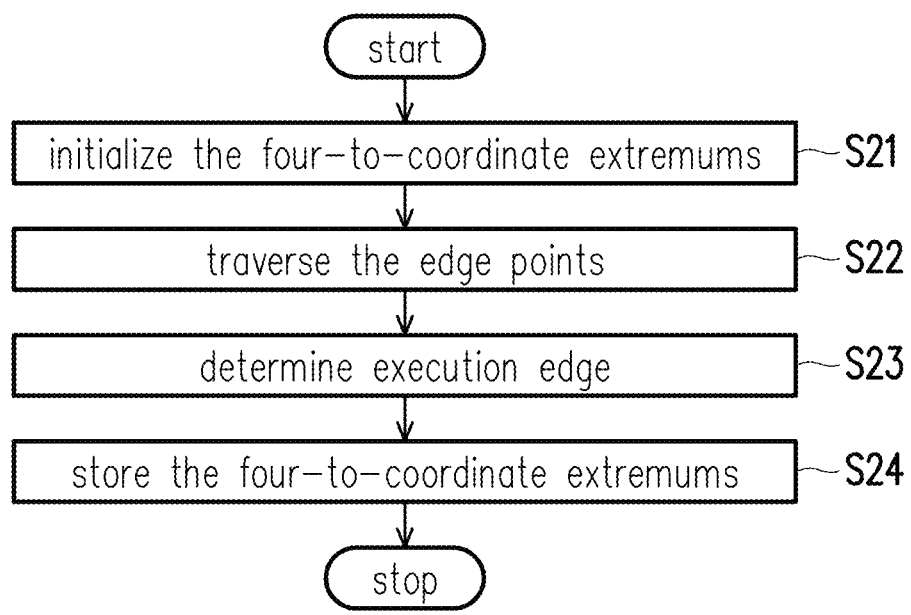
FIG. 2 is a flowchart of obtaining a four-to-coordinate extremum according to an embodiment of the disclosure.

Refer to FIG. 2 for detailed process of Step S2.

Step S21: initialize the four-to-coordinate extremums of the polygon b as XE, XW, YN, and YS, respectively.

Step S22: set a node coordinate of the polygon b as (Xb, Yb) and traverse edge points of the polygon b.

Step S23: determine an execution edge, wherein if Xb>XE, then XE=Xb; if Xb<XW, then XW=Xb; if Yb>YN, then YN=Yb; and if Yb<YS, then YS=Yb.

Step S24: store the four-to-coordinate extremums XE, XW, YN, and YS into an attribute list of the polygon b.

Figure 3:
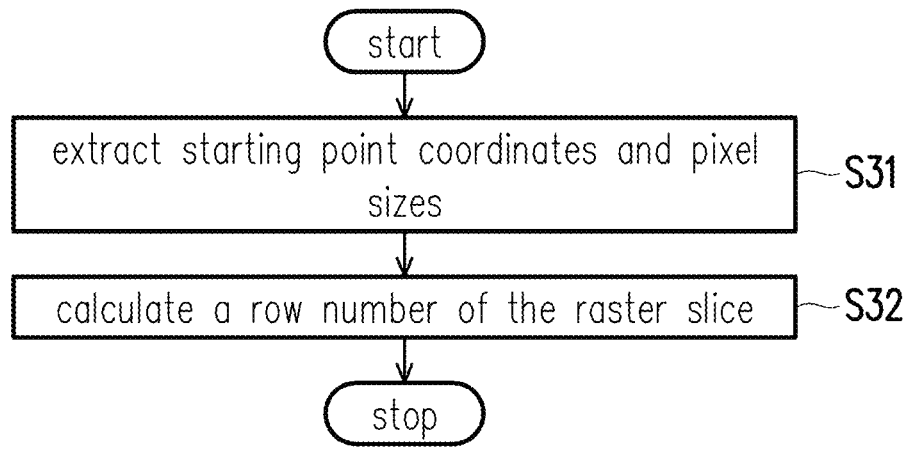
FIG. 3 is a flowchart of obtaining a minimum raster slice according to an embodiment of the disclosure.

Refer to FIG. 3 for detailed process of Step S3.

Step S31: extract starting point coordinates X0 and Y0 and pixel sizes Xs and Ys of the raster dataset A.

Step S32: calculate a starting row number Rstart, a starting column number Cstart, a stopping row number Rstop, and a stopping column number Cstop of the raster slice a:

$$R\text{start} = \lfloor (YN-Y0)/Ys \rfloor,$$

$$C\text{start} = \lfloor (XW-X0)/Xs \rfloor,$$

$$R\text{stop} = \lfloor (YS-X0)/Ys \rfloor,$$

$$C\text{stop} = \lfloor (XE-X0)Xs \rfloor,$$

Figure 4:
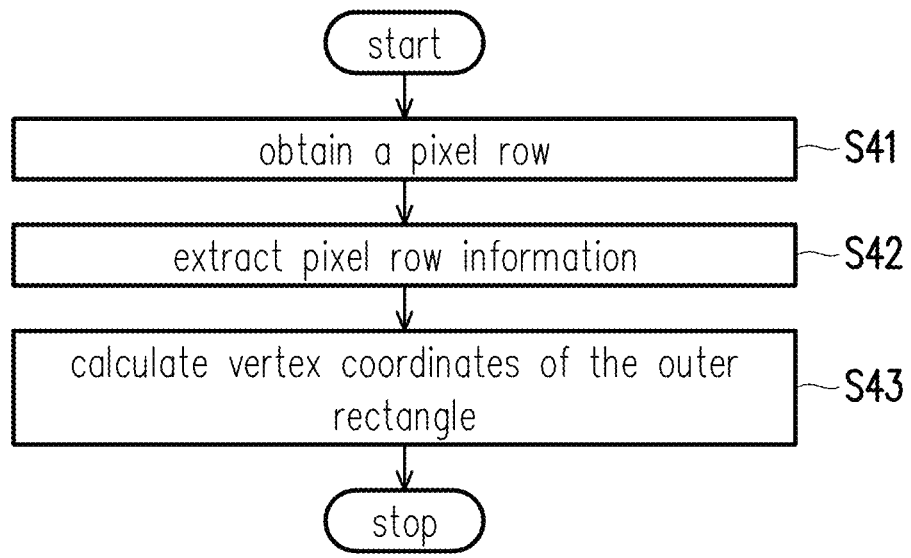
FIG. 4 is a flowchart of obtaining an outer rectangle of a pixel row according to an embodiment of the disclosure.

Refer to FIG. 4 for detailed process of Step S4.

Step S41: traverse the raster slice a according to a row of a pixel to obtain a pixel row ARow.

Step S42: extract a row number Ra, the starting column number Cstart, and the stopping column number Cstop of the pixel row ARow.

Figure 5A:
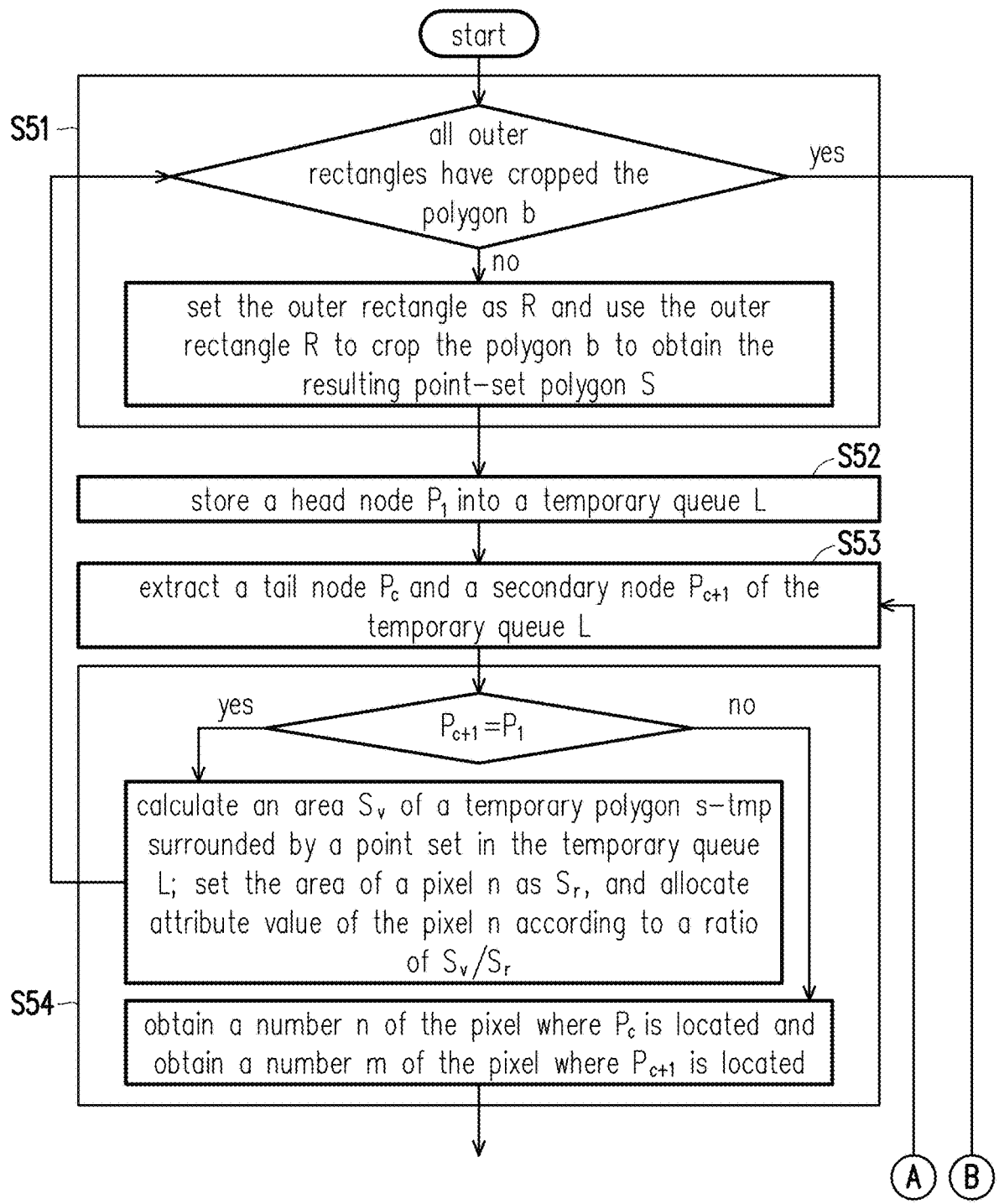
FIG. 5A and FIG. 5B are a flowchart of cropping and allocating pixel attributes according to an embodiment of the disclosure.
Figure 5B:
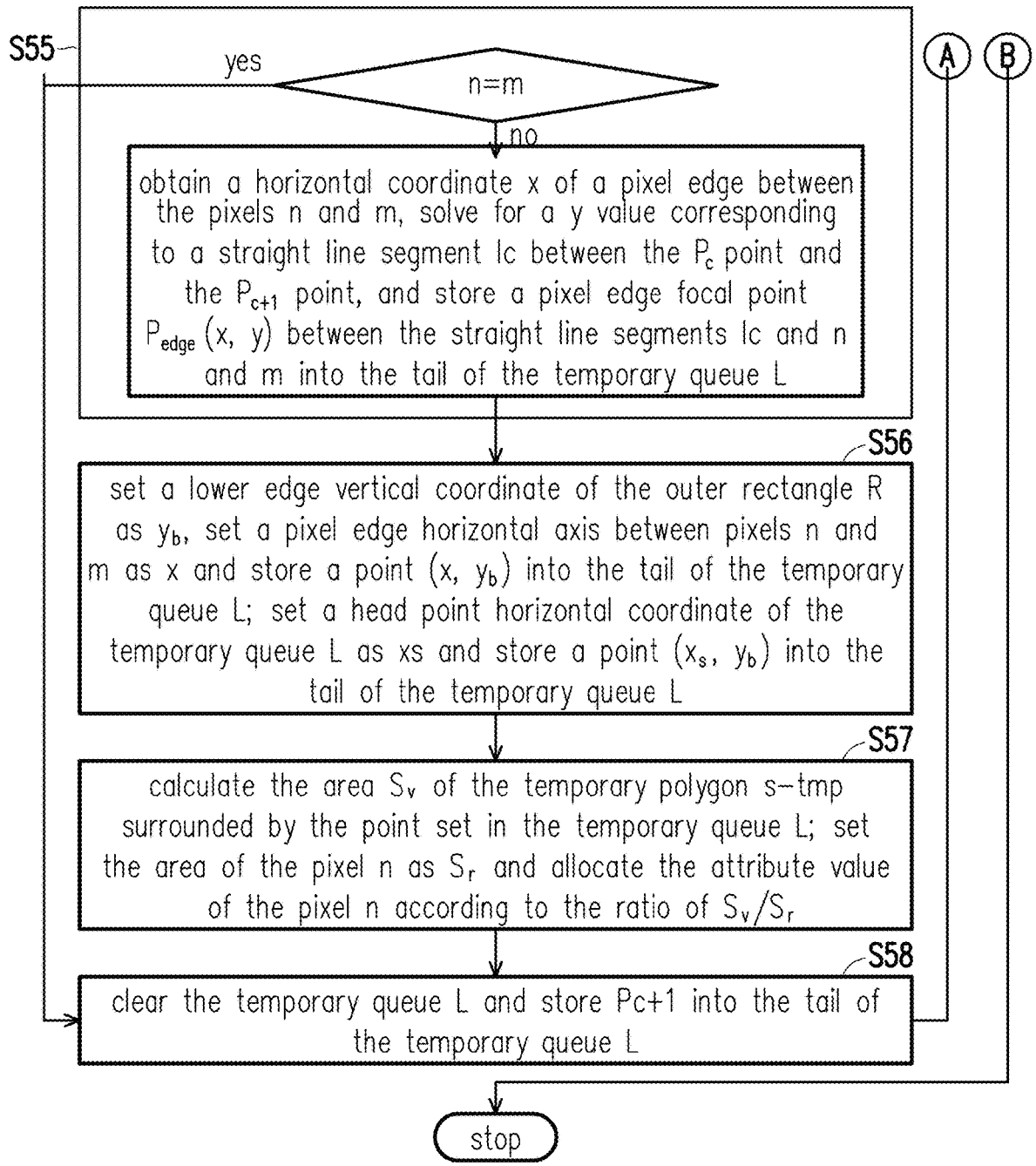

Step S43: set the outer rectangle of the pixel row ARow as R and respectively calculate vertex coordinates (Xmin, Ymax), (Xman, Ymax), (Xmax, Ymin), and (Xmin, Ymin) of the outer rectangle R:

$X\min = C\text{start} \cdot Xs,$ $X\max = (C\text{stop}+1) \cdot Xs,$ $Y\min = (Ra+1) \cdot Ys,$ $Y\max = Ra \cdot Ys.$ Refer to FIG. 5 for detailed process of Step S5.

Step S51: determine whether all outer rectangles in the raster slice a have cropped the polygon b, wherein if not, then use the outer rectangle R to crop the polygon b to obtain the resulting point-set polygon S; and if yes, then iteration of Step S5 is completed.

Step S52: set a coordinate point in the resulting point-set polygon S as $P_i(i \in N^*)$ and store a first node $P_1$ into a temporary queue L.

Step S53: traverse the $P_i$ point and store into the temporary queue L and set the current last node of the temporary queue L as $P_c$, then a secondary node of $P_c$ in the resulting point-set polygon S is $P_{c+1}$.

Step S54: compare values of $P_{c+1}$ and $P_1$, wherein if $P_{c+1}=P_1$, then calculate an area $S_v$ of a temporary polygon s-tmp surrounded by a point set in the temporary queue L; set the area of a pixel n as $S_r$, allocate an attribute value of the pixel n according to a ratio of $S_v/S_r$, and execute Step S51; wherein if $P_{c+1} \neq P_1$, then extract a number n of the pixel where $P_c$ is located and extract a number m of the pixel where $P_{c+1}$ is located.

Step S55: compare values of n and m, wherein if n=m, then execute Step S58; and if n m, then obtain a horizontal coordinate x of a pixel edge between the pixels n and m, create a straight line segment lc based on the $P_c$ point and the $P_{c+1}$ point, substitute x into lc to solve for a y value, record a pixel edge focal point $P_{edge}(x, y)$ between the straight line segment lc and n and m, and store $P_{edge}(x, y)$ into a last part of the temporary queue L.

Step S56: set a lower edge vertical coordinate of the outer rectangle R as yb, set a horizontal coordinate of a pixel edge between the pixels n and m as x, and store a point (x, yb) into the last part of the temporary queue L; and set a horizontal coordinate of a first point of the temporary queue L as xs and store a point (xs, yb) into the last part of the temporary queue L.

Step S57: calculate the area $S_v$ of the temporary polygon s-tmp surrounded by the point set in the temporary queue L; set the area of the pixel n as $S_r$ and allocate the attribute value of the pixel n according to the ratio of $S_v/S_r$.

Step S58: clear the temporary queue L, store $P_{c+1}$ into the last part of the temporary queue L, and execute Step S53.

Figure 6:
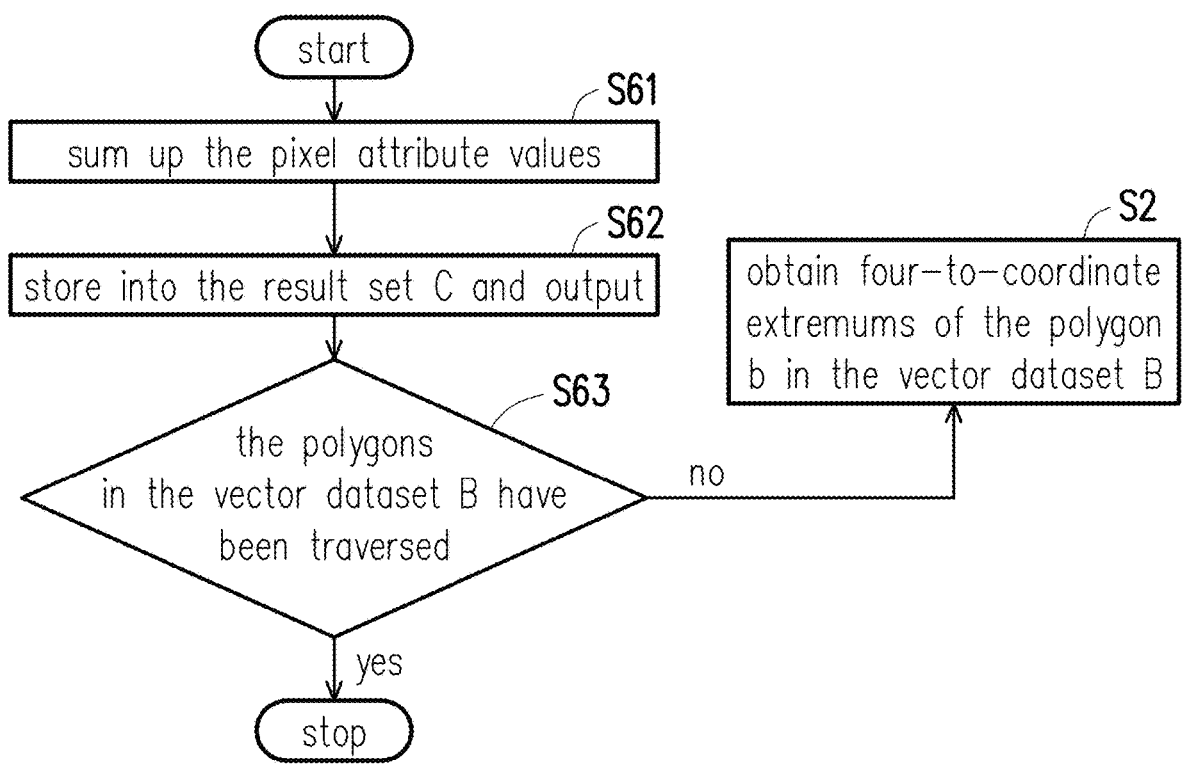
FIG. 6 is a flowchart of determining to stop an iteration and outputting an analysis result according to an embodiment of the disclosure.

Refer to FIG. 6 for detailed process of Step S6.

Step S61: sum up the pixel attribute values of the resulting point-set polygon S.

Step S62: set the result set as C and store the pixel attribute values in the resulting point-set polygon S into the result set C and output.

Step S63: determine whether the polygons in the vector dataset B have been traversed, wherein if not, then execute Step S2; and if yes, then iteration is completed.

Figure 7:
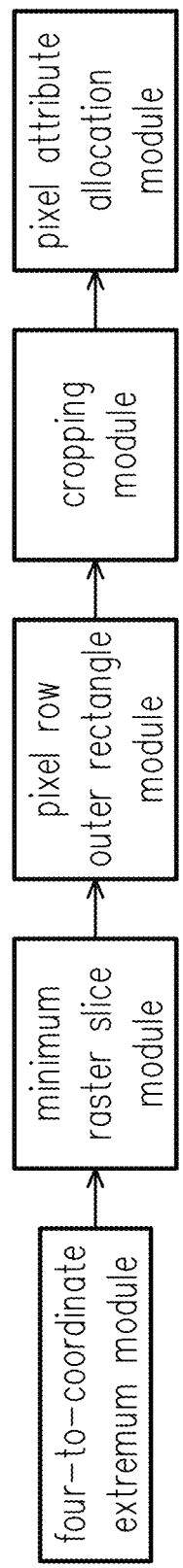
FIG. 7 is a functional block diagram according to an embodiment of the disclosure.

Referring to FIG. 7, a system for vector-raster overlay analysis of a ground surface image area based on edge clipping according to the disclosure is configured for overlay analysis of the raster dataset A and the vector dataset B. The raster dataset A includes spatial information of regular grid data that divides a ground surface image, wherein each grid includes multiple pixels and attribute values allocated to each pixel, and the pixel is the smallest unit of the digital image. The vector dataset B includes several polygon data of the ground surface image, which is a collection of large-scale terrain image data of the ground surface image. The structure of the vector data of the ground surface image includes a simple data structure, a topological data structure, and a curved surface data structure. The embodiment of the disclosure includes a four-to-coordinate extremum module, a minimum raster slice module, a pixel row outer rectangle module, a cropping module, and a pixel attribute allocation module. The four-to-coordinate extremum module, the smallest raster slice module, the pixel row outer rectangle module, the cropping module, and the pixel attribute allocation module are connected in series. The four-to-coordinate extremum module is configured to traverse graphic data of the polygon b in the vector dataset B to obtain the four-to-coordinate extremums of the polygon b, wherein the polygon b is a polygon formed by the edge of the ground surface image to be measured and the four-to-coordinate extremums are the edge coordinate extremums in four directions of east, west, south, and north of the polygon b. The minimum raster slice module is configured to obtain the data of the smallest raster slice of the raster dataset A that completely covers the polygon b according to the starting point coordinates of the raster dataset A, the pixel sizes of the raster dataset A, and the four-to-coordinate extremums of the polygon b. The pixel row outer rectangle module is configured to traverse the raster slice a by row to obtain the outer rectangle R of the pixel row. The cropping module is configured to crop the polygon b using the outer rectangle R to obtain the resulting point-set polygon S including multiple temporary polygons and pixels. The pixel attribute allocation module is configured to traverse the resulting point-set polygon S and allocate the pixel attribute value of the resulting point-set polygon S according to the ratio of an area of a temporary polygon to an area of a pixel where the temporary polygon is located as the analysis result and store into the result set C.

A computer storage medium stores a computer program of the method for vector-raster overlay analysis of a ground surface image area based on edge clipping executable by a computer processor.

Figure 8:
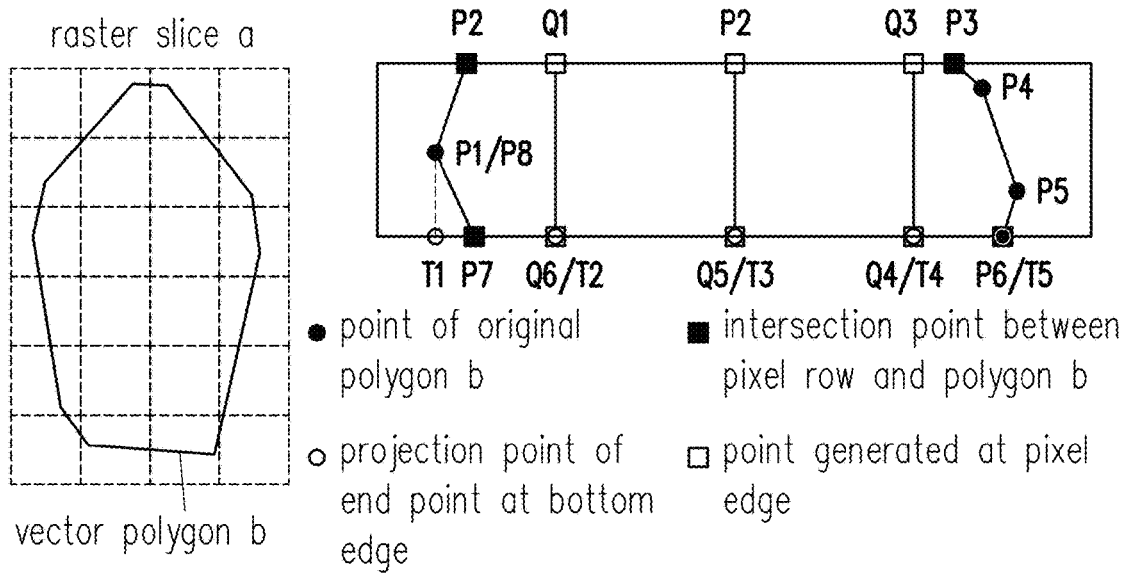
FIG. 8 is a data structure diagram 1 according to an embodiment of the disclosure.
Figure 9:
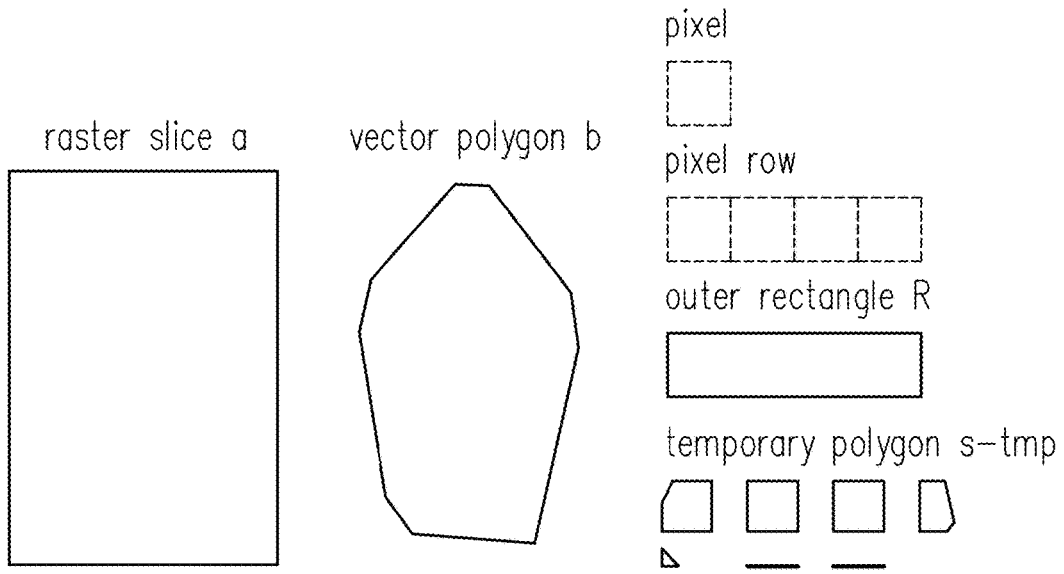
FIG. 9 is a data structure diagram 2 according to an embodiment of the disclosure.

The data structure and the result set generated during the analysis process according to the embodiments of the disclosure are shown in FIG. 8 and FIG. 9. It can be observed that multiple raster slices a completely cover the polygon b, the raster slices a are traversed by row to obtain the outer rectangle R of the pixel row, and the outer rectangle R is used to crop the polygon b to obtain the resulting point-set polygon S. The resulting point-set polygon S shown in FIG. 4 includes multiple temporary polygons s-tmp: S(P1, P2, Q1, T2, T1, P1), S(Q1, Q2, T3, T2, Q1), S(Q2, Q3, T4, T3, Q2), S(Q3, P3, P4, P5, P6, Q4, Q3), S(Q6, P7, P8, T1, T2, Q6), S(Q5, Q6, T2, T3, Q5), and S(Q4, Q5, T3, T4, Q4), which are all stored in the result set C. The result set C includes all resulting point-set polygons S generated after cropping, wherein a point $Q_i(i \in N^*)$ is a point generated at the pixel edge during the cropping process and a point $T_i(i \in N^*)$ is a projection point of each point on a bottom edge of the pixel edge.

Figure 10:
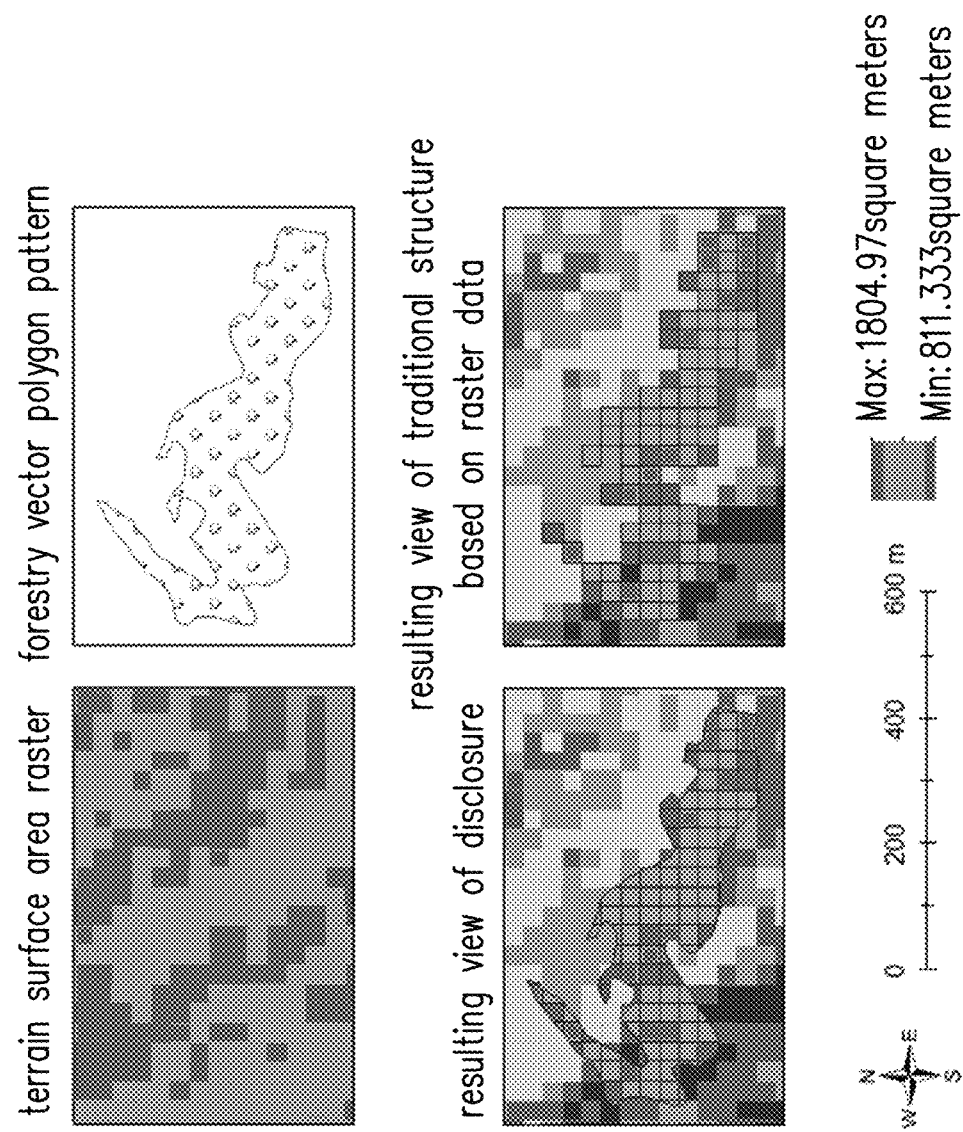
FIG. 10 is a result diagram of a surface area image of a forest vector pattern diagram outputted according to an embodiment of the disclosure.

The comparison between the result of the ground surface image area of the forest vector pattern outputted according to the embodiments of the disclosure and the result outputted according to the traditional algorithm based on the raster data structure is shown in FIG. 10. The loss of accuracy can be observed for conventional technology based on spatial overlay analysis of unified raster data basis, which results in calculation error of polygon surface area. However, the disclosure adopts the vector-raster overlay analysis method while more accurately cropping plot points of the ground surface image area through edge clipping and allocation of pixel attribute values. Therefore, the output result is more accurate. On the other hand, the disclosure does not drastically increase the calculation amount while accurately calculating the ground surface image area, thereby realizing the function of improving the accuracy and efficiency of calculating the ground surface image area.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for vector-raster overlay analysis of a ground surface image area based on edge clipping, comprising:
   Step S1: collecting data of a raster dataset A and a vector dataset B of an area to be measured;
   Step S2: traversing a polygon b in the vector dataset B to obtain four-to-coordinate extremums;
   Step S3: traversing the polygon b to obtain a smallest raster slice a of the raster dataset A completely covering the polygon b;
   Step S4: traversing the raster slice a by row to obtain an outer rectangle R of a pixel row;
   Step S5: cropping the polygon b using the outer rectangle R to obtain a resulting point-set polygon S, storing a result obtained by traversing the resulting point-set polygon S into a result set C, allocating a pixel attribute value according to an area ratio, and including in the result set C; and
   Step S6: collating attribute values in the result set C as a result for overlay analysis of the raster dataset A and the vector dataset B,
   wherein specific steps in Step S2 comprise:
      Step S21: traversing the polygon b of the vector dataset B;
      Step S22: initializing the four-to-coordinate extremums of the polygon b as XE, XW, YN, and YS, respectively;
      Step S23: traversing a node of the polygon b to be set as (Xb, Yb);
      Step S24: determining an execution edge, wherein if Xb>XE, then XE=Xb; if Xb<XW, then XW=Xb, if Yb>YN, then YN=Yb; and if Yb<YS, then YS=Yb; and
      Step S25: including the four-to-coordinate extremums XE, XW, YN, and YS into an attribute list of the polygon b after the node of the polygon b is traversed and executing from Step S21 in cycle until all polygons in the vector dataset B are traversed,
   wherein specific steps in Step S3 comprise:
      Step S31: reading starting point coordinates X0 and Y0 and pixel sizes Xs and Ys of the raster dataset A;
      Step S32: reading the four-to-coordinate extremums XE, XW, YN, and YS of the polygon b; and
      Step S33: calculating a starting row number Rstart, a starting column number Cstart, a stopping row number Rstop, and a stopping column number Cstop of the raster slice a and reading data of the raster slice a:

$$R\text{start} = \lfloor (YN-Y0)/Ys \rfloor,$$

$$C\text{start} = \lfloor (XW-X0)/Xs \rfloor,$$

$$R\text{stop} = \lfloor (YS-X0)/Ys \rfloor,$$

$$C\text{stop} = \lfloor (XE-X0)Xs \rfloor.$$

2. The method for vector-raster overlay analysis of a ground surface image area based on edge clipping according to claim 1, wherein specific steps in Step S4 comprise:
   Step S41: traversing a data row of the raster slice a to be recorded as ARow;
   Step S42: reading a row number Ra, the starting column number Cstart, and the stopping column number Cstop of the data row ARow; and
   Step S43: creating the outer rectangle R of the data row ARow and respectively calculating vertex coordinates (Xmin, Ymax), (Xman, Ymax), (Xmax, Ymin), and (Xmin, Ymin) of the outer rectangle R:

$$X\min = C\text{start} \cdot Xs,$$

$$X\max = (C\text{stop}+1) \cdot Xs,$$

$$Y\min = (Ra+1) \cdot Ys,$$

$$Y\max = Ra \cdot Ys.$$

3. The method for vector-raster overlay analysis of a ground surface image area based on edge clipping according to claim 2, wherein specific steps in Step S5 comprise:
   Step S51: cropping the polygon b using the outer rectangle R to obtain a resulting point-set polygon S;
   Step S52: setting a coordinate point in the resulting point-set polygon S as $P_i$ ($i \in N$ *) and storing a first node $P_1$ of the resulting point-set polygon S in a temporary queue L;
   Step S53: traversing a $P_i$ point of the resulting point-set polygon S and storing into the temporary queue L, setting a result set as C, setting a current last node of the temporary queue L as $P_c$, wherein a secondary node of $P_c$ in the resulting point-set polygon S is $P_{c+1}$;
   Step S54: comparing values of $P_{c+1}$ and $P_1$; wherein
   if $P_{c+1}=P_1$, then $P_i$ has been traversed and process returns to Step S3 after executing Step S57; and
   if $P_{c+1} \ne P_1$, then a number n of a pixel where $P_c$ is located is obtained and a number m of a pixel where $P_{c+1}$ is located is obtained;
   Step S55: comparing values of n and m; wherein
   if n=m, then Step S58 is executed; and
   if n≠m, then a horizontal coordinate x of a pixel edge between the pixels n and m is obtained, a straight line segment lc is created according to the $P_c$ point and the $P_{c+1}$ point, x is substituted into lc to solve for a y value, a pixel edge focal point $P_{edge}(x, y)$ between the straight line segment lc and n and m is recorded, and $P_{edge}(x, y)$ is stored in a last part of the temporary queue L;
   Step S56: setting a lower edge vertical coordinate of the outer rectangle R as yb, setting a horizontal coordinate of a pixel edge between the pixels n and m as x, storing a point (x, yb) into the last part of the temporary queue L, setting a horizontal coordinate of a first point of the temporary queue L as xs, and storing a point (xs, yb) into the last part of the temporary queue L;

Step S57: calculating an area of a temporary polygon s-tmp surrounded by a point set in the temporary queue L, allocating an attribute value of a pixel according to an area ratio method, and including in the result set C;

Step S58: clearing the temporary queue L, storing $P_{c+1}$ to the last part of the temporary queue L, and executing Step S53 until traversal is completed.

4. The method for vector-raster overlay analysis of a ground surface image area based on edge clipping according to claim 3, wherein in Step S57, the specific steps of the area ratio method comprise: setting an area of the temporary polygon s-tmp as $S_v$, setting an area of the pixel n as $S_r$, and allocating an attribute value of the pixel n is as the attribute value of the temporary polygon s-tmp according to a ratio of $S_v/S_r$.

5. The method for vector-raster overlay analysis of a ground surface image area based on edge clipping according to claim 2, wherein in Step S41, the data row of the raster slice a is a row of a pixel of the raster slice a.

6. The method for vector-raster overlay analysis of a ground surface image area based on edge clipping according to claim 1, wherein in Step S1, the area to be measured is an area of a ground surface image to be measured; the raster dataset A comprises a regular grid dividing the ground surface image, each grid unit is a pixel, and the pixel is a smallest unit forming a digital image; and the vector dataset B comprises a plurality of polygon data of the ground surface image.

7. The method for vector-raster overlay analysis of a ground surface image area based on edge clipping according to claim 6, wherein in Step S5, the resulting point-set polygon S comprises a plurality of temporary polygons; and the area ratio is a ratio of an area of a temporary polygon to an area of a pixel where the temporary polygon is located.

8. The method for vector-raster overlay analysis of a ground surface image area based on edge clipping according to claim 1, wherein in Step S2, the four-to-coordinate extremums are edge coordinate extremums in four directions of east, west, south, and north of the polygon b.

9. The method for vector-raster overlay analysis of a ground surface image area based on edge clipping according to claim 1 wherein a step is added between Step S4 and Step S5, the step comprising: determining whether all outer rectangles in the raster slice a have cropped the polygon b; wherein if not, the polygon b is cropped using the outer rectangle R to obtain the resulting point-set polygon S; and if yes, iteration of Step S5 is completed.

10. The method for vector-raster overlay analysis of a ground surface image area based on edge clipping according to claim 9, wherein a step is added between Step S5 and Step S6, the step comprising: repeating Step S5 until all outer rectangles of the raster slice a have cropped the polygon b.

11. The method for vector-raster overlay analysis of a ground surface image area based on edge clipping according to claim 10, wherein Step S54 comprises: comparing values of $P_{c+1}$ and $P_1$; wherein if $P_{c+1}=P_1$, then the area $S_v$ of the temporary polygon s-tmp surrounded by the point set in the temporary queue L is calculated; setting the area of the pixel n as $S_r$, allocating the attribute value of the pixel n according to the ratio of $S_v/S_r$ and determining whether all outer rectangles in the raster slice a have cropped the polygon b, wherein if not, then the polygon b is cropped using the outer rectangle R to obtain the resulting point-set polygon S; and if yes, then iteration of Step S5 is completed; and if $P_{c+1} \neq P_1$, then the number n of the pixel where $P_c$ is located is extracted and the number m of the pixel where $P_{c+1}$ is located is extracted.

12. The method for vector-raster overlay analysis of a ground surface image area based on edge clipping according to claim 11, wherein specific steps in Step S6 comprise:

Step S61: summing up pixel attribute values of the resulting point-set polygon S;

Step S62: setting a result set as C, storing the pixel attribute values in the resulting point-set polygon S into the result set C, and outputting; and Step S63: determining whether a polygon in the vector dataset B has been traversed, wherein if not, Step S2 is executed; and if yes, iteration is completed.

13. A system for vector-raster overlay analysis of a ground surface image area based on edge clipping, comprising:

a non-transitory tangible medium, storing a plurality of modules and a computer program executable by a processor, wherein the computer program is executed according to the method for vector-raster overlay analysis of a ground surface image area based on edge clipping according to claim 1;

the processor coupled to the non-transitory tangible medium, wherein the processor accesses and executes the plurality of modules, wherein the plurality of modules comprises a four-to-coordinate extremum module, a minimum raster slice module, a pixel row outer rectangle module, a cropping module, and a pixel attribute allocation module; wherein the four-to-coordinate extremum module, the smallest raster slice module, the pixel row outer rectangle module, the cropping module, and the pixel attribute allocation module are connected in series;

the four-to-coordinate extremum module is configured to traverse graphic data of a polygon b in a vector dataset B to obtain four-to-coordinate extremums of the polygon b; the vector dataset B comprises a plurality of polygon data of a ground surface image, the polygon b is a polygon formed by an edge of the ground surface image to be measured, and the four-to-coordinate extremums are edge coordinate extremums in four directions of east, west, south, and north of the polygon b;

the minimum raster slice module is configured to obtain data of a smallest raster slice a of a raster dataset A completely covering the polygon b according to starting point coordinates of the raster dataset A, pixel sizes of the raster dataset A, and the four-to-coordinate extremums of the polygon b; the raster dataset A comprises spatial information of the ground surface image and a pixel is a smallest unit of a digital image;

the pixel row outer rectangle module is configured to traverse the raster slice a by row to obtain an outer rectangle R of a pixel row;

the cropping module is configured to crop the polygon b using the outer rectangle R to obtain a resulting point-set polygon S comprising a plurality of temporary polygons and pixels; and the pixel attribute allocation module is configured to traverse the resulting point-set polygon S and allocate a pixel attribute value of the resulting point-set polygon S according to a ratio of an area of a temporary polygon to an area of a pixel where the temporary polygon is located as an analysis result.

14. The system for vector-raster overlay analysis of a ground surface image area based on edge clipping according to claim 13, wherein the raster dataset A comprises a regular grid dividing the ground surface image and each grid unit is a pixel.

15. The system for vector-raster overlay analysis of a ground surface image area based on edge clipping according to claim 13, wherein the vector dataset B comprises large-scale terrain image data of the ground surface image and a structure of vector data of the ground surface image comprises a data structure, a topological data structure, and a curved surface data structure.

\* \* \* \* \*